(12) United States Patent
Leroyer

(10) Patent No.: US 8,757,676 B2
(45) Date of Patent: Jun. 24, 2014

(54) DEVICE FOR LOCKING AN OPENING PANEL OF A MOTOR VEHICLE

(75) Inventor: Bruno Leroyer, Orgerus (FR)

(73) Assignee: Renault S.A.S., Boulogne-Billancourt (FR)

( * ) Notice: Subject to any disclaimer, the term of this patent is extended or adjusted under 35 U.S.C. 154(b) by 604 days.

(21) Appl. No.: 13/121,842

(22) PCT Filed: Sep. 17, 2009

(86) PCT No.: PCT/FR2009/051752
§ 371 (c)(1),
(2), (4) Date: Jun. 21, 2011

(87) PCT Pub. No.: WO2010/037943
PCT Pub. Date: Apr. 8, 2010

(65) Prior Publication Data
US 2011/0254286 A1    Oct. 20, 2011

(30) Foreign Application Priority Data
Sep. 30, 2008 (FR) ...................................... 08 56596

(51) Int. Cl.
*E05C 3/02* (2006.01)
(52) U.S. Cl.
USPC ...... 292/194; 292/216; 292/304; 292/DIG. 5; 296/121; 296/107.09
(58) Field of Classification Search
USPC ............... 292/194, 4, 5, 18, 56, 63, 121, 240, 292/216, 219, 304, DIG. 5, DIG. 14, 292/DIG. 36, DIG. 42; 296/121, 124, 107.09
See application file for complete search history.

(56) References Cited

U.S. PATENT DOCUMENTS

| | | | | |
|---|---|---|---|---|
| 4,917,415 A | * | 4/1990 | Wurl | 292/113 |
| 5,678,881 A | * | 10/1997 | Tokarz | 296/121 |

(Continued)

FOREIGN PATENT DOCUMENTS

| | | |
|---|---|---|
| EP | 1 512 816 | 3/2005 |
| FR | 2 695 596 | 3/1994 |

(Continued)

OTHER PUBLICATIONS

International Search Report issued Dec. 8, 2009 in PCT/FR09/051752 filed Sep. 17, 2009.

*Primary Examiner* — Mark Williams
(74) *Attorney, Agent, or Firm* — Oblon, Spivak, McClelland, Maier & Neustadt, L.L.P.

(57) ABSTRACT

A device for locking a motor vehicle opening panel, and a latch designed for such a locking device. The opening panel includes an opening mechanism so that it can be moved between a closed position in which the opening panel closes off an opening in the roof of the vehicle, and an open position in which the opening panel at least partially uncovers the opening. The opening mechanism includes at least one link rod, a first end of which is articulated to the vehicle about a first fixed transverse axis and a second end of which is articulated to the mobile opening panel about a second transverse axis. The opening panel is mounted to pivot about a third transverse axis able to move longitudinally with respect to the roof. The locking device includes a latch including a base fixed to the opening panel and including a throat configured to accept a fist striker in the closed position and a second striker in the open position. At least one of the strikers is mounted to move relative to the latch and relative to the vehicle.

11 Claims, 3 Drawing Sheets

(56) References Cited

U.S. PATENT DOCUMENTS

| | | | |
|---|---|---|---|
| 5,839,778 A * | 11/1998 | Schaible et al. | 296/224 |
| 6,520,560 B2 * | 2/2003 | Schutt et al. | 296/121 |
| 6,799,789 B2 * | 10/2004 | Guillez et al. | 296/121 |
| 7,654,605 B2 * | 2/2010 | Hayashi et al. | 296/121 |
| 8,215,683 B2 * | 7/2012 | Drescher et al. | 292/216 |
| 8,534,720 B2 * | 9/2013 | Meyer et al. | 292/216 |
| 2004/0189041 A1 * | 9/2004 | Lange | 296/121 |
| 2009/0152906 A1 | 6/2009 | Godet | |

FOREIGN PATENT DOCUMENTS

| | | |
|---|---|---|
| FR | 2 872 097 | 12/2005 |
| FR | 2 876 959 | 4/2006 |

\* cited by examiner

DEVICE FOR LOCKING AN OPENING PANEL OF A MOTOR VEHICLE

The present invention relates to a device for locking an opening panel of a motor vehicle.

The invention relates more precisely to a device for locking an opening panel of a motor vehicle roof.

Certain motor vehicles, more particularly utility vehicles, have an opening that is made in the rear area of the roof and can be closed off by an opening panel. This opening panel is known as a "girafon" and, when it is opened, makes it possible to place long loads, for example planks, in the vehicle, said loads then protruding out of the rear of the vehicle through the opening of the girafon. For security reasons, the girafon must comprise a locking device that keeps said opening panel in the open position in addition to a conventional locking device for keeping the opening panel in the closed position.

Document FR2876959 thus proposes a vehicle opening panel of the girafon type, which is mounted such that it can be moved between a closed position and an open position. This opening panel comprises a front part that is mounted such that it can pivot with respect to a pin that is mounted transversely and able to move in longitudinal translation on the roof, and also a rear part that is mounted such that it can pivot with respect to a pin that is mounted transversely and able to rotate with respect to a fixed transverse pin of the vehicle by means of a guide arm.

In order to be locked in the open and closed positions, the opening panel comprises a locking device, which is formed in particular by a throat and a latch which is provided with an actuating handle and is secured to the opening panel. This locking device is able to be coupled either to a striker of a structural element of the vehicle or to a striker of an element linking said guide arms together.

However, such a locking mechanism obliges the user to open the latch in order to introduce one of the two strikers into the throat. In addition, for space and esthetic reasons, it is possible for the mechanism not to comprise an element linking said guide arms together, making locking impossible in the open position.

The object of the present invention is thus to make available an improved locking device in order to alleviate these drawbacks by providing a roof opening panel having a simple locking device which is easy to handle and is cost-effective.

To this end, the invention provides a device for locking an opening panel of a motor vehicle, said device being able to move between a closed position, in which the opening panel closes off an opening in the roof of the vehicle, and an open position, in which the opening panel at least partially uncovers the opening, the locking device comprising a lock formed of a base fixed to the opening panel and comprising a throat able to receive a first striker in the closed position and a second striker in the open position, at least one of the strikers being mounted such that it can move with respect to the lock and with respect to the vehicle.

This invention advantageously makes it possible to have only one striker that is fixed with respect to the vehicle.

According to further features of the invention, the movable striker can be mounted such that it can rotate about a transverse pin and/or be mounted in a fixed manner with respect to a link rod of the opening mechanism of the opening panel.

The invention also provides a lock mounted in the locking device, it being possible for said lock to comprise a latch mounted such that it can pivot about a pin on the base so as to be able to close off the throat, the latch comprising a first convex edge so as to form an appropriate angle with the first path of the movable striker in order that the force of the movable striker on the first edge pivots the latch about said pin.

The latch can also include a second edge that prolongs the first edge, the second edge being convex so as to form an appropriate angle with the second path of the other striker in order that the force of the other striker on the second edge pivots the latch about its pin.

A first wall of the throat can be approximately tangent to the second path, and a second wall of the throat can be approximately tangent to the first path.

Further features and advantages of the invention will become apparent from reading the description of an example which will now be given with reference to the appended drawings, in which.

In the rest of the description, X, Y, Z are defined as the longitudinal, transverse and vertical directions of the motor vehicle. In the figures, the direction X is directed toward the rear of the vehicle. The terms front and rear refer respectively to the front and rear of the vehicle.

Figure 1:
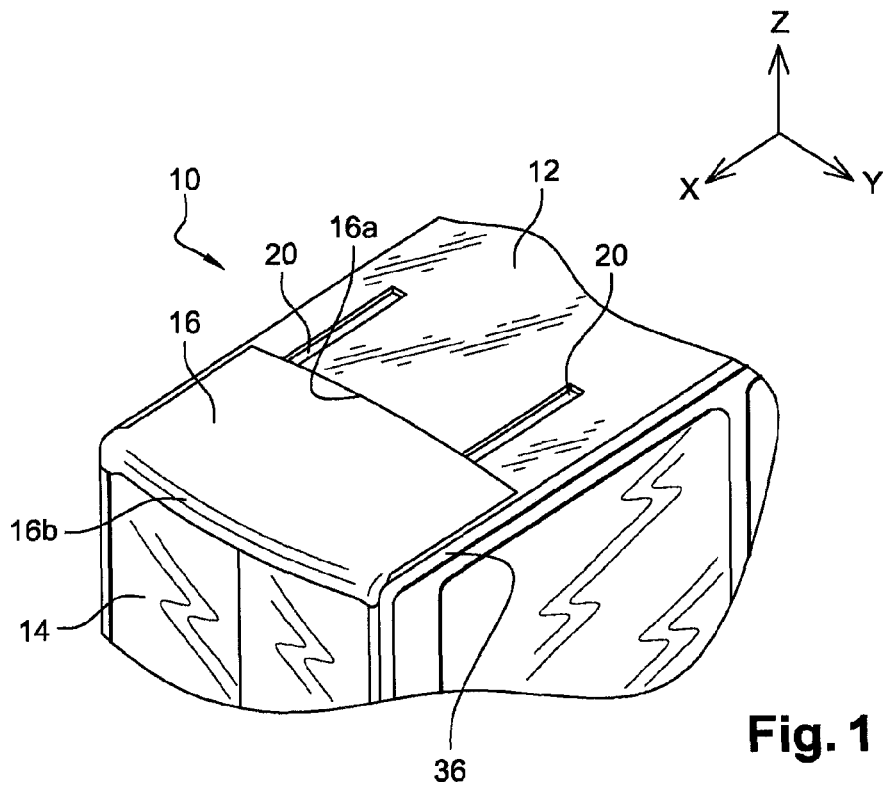
FIGS. 1 and 2 are schematic views of a roof of a utility type vehicle, comprising a girafon according to the invention in the closed and open positions, respectively.
Figure 2:
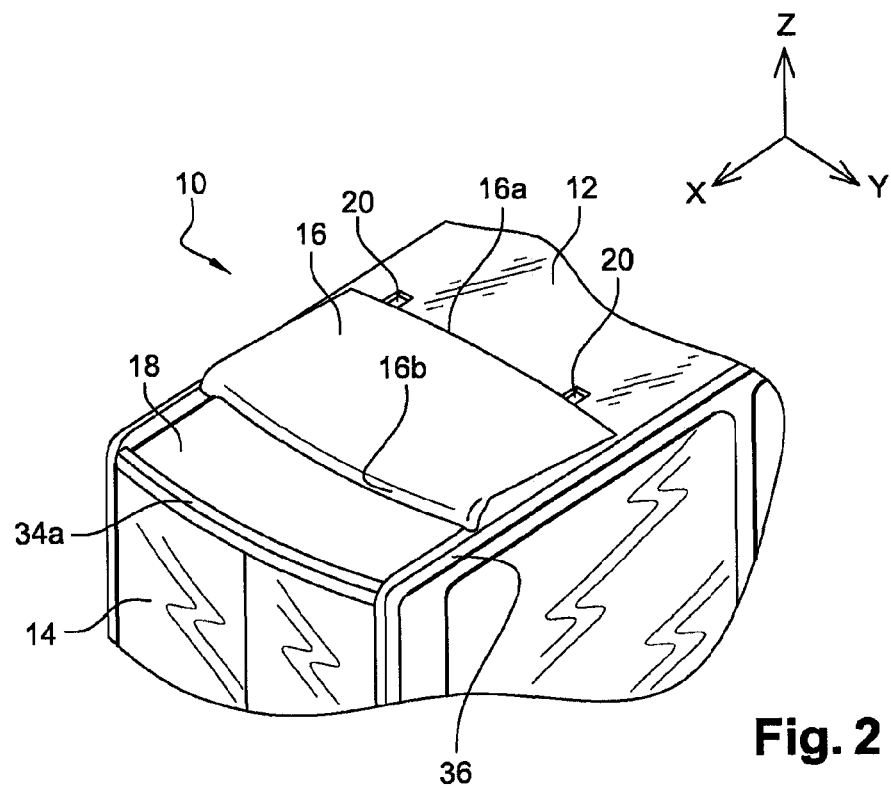
Figure 3:
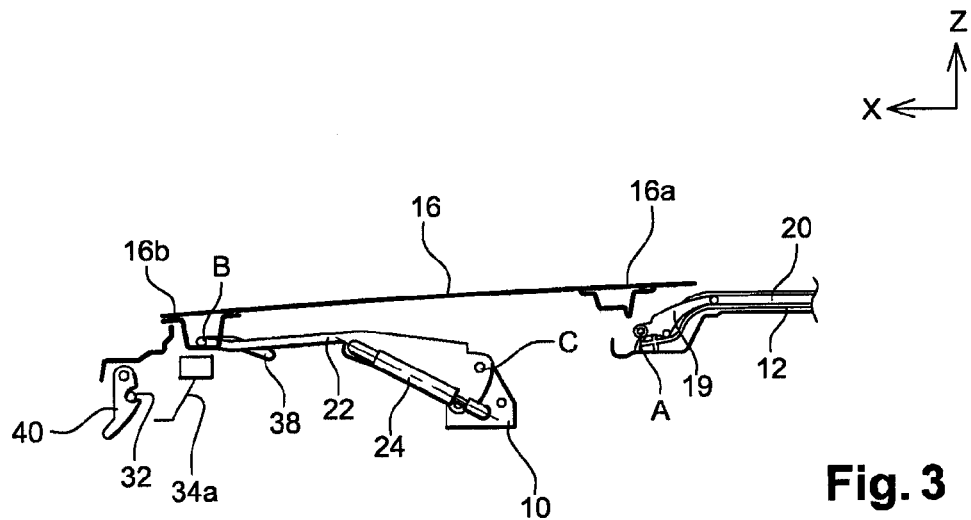
FIGS. 3 and 4 are views in longitudinal section of FIGS. 1 and 2, respectively, showing the girafon comprising the locking device of the invention.

With reference to FIGS. 1 and 2, a motor vehicle 10 comprises a roof 12 and a rear face formed in this example of a rear swinging door 14.

In the immediate proximity of the rear swinging door 14, the roof is provided with an opening panel 16 which closes off an opening 18. In the closed position shown in FIG. 1, the opening panel 16 extends flush with the roof 12 and above the opening 18, which it closes off completely.

Figure 4:
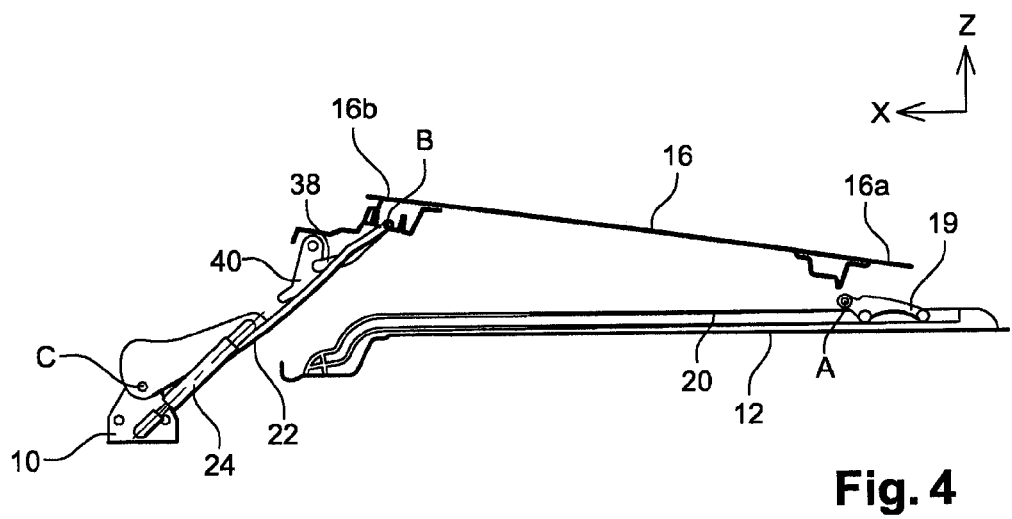
Figure 5:
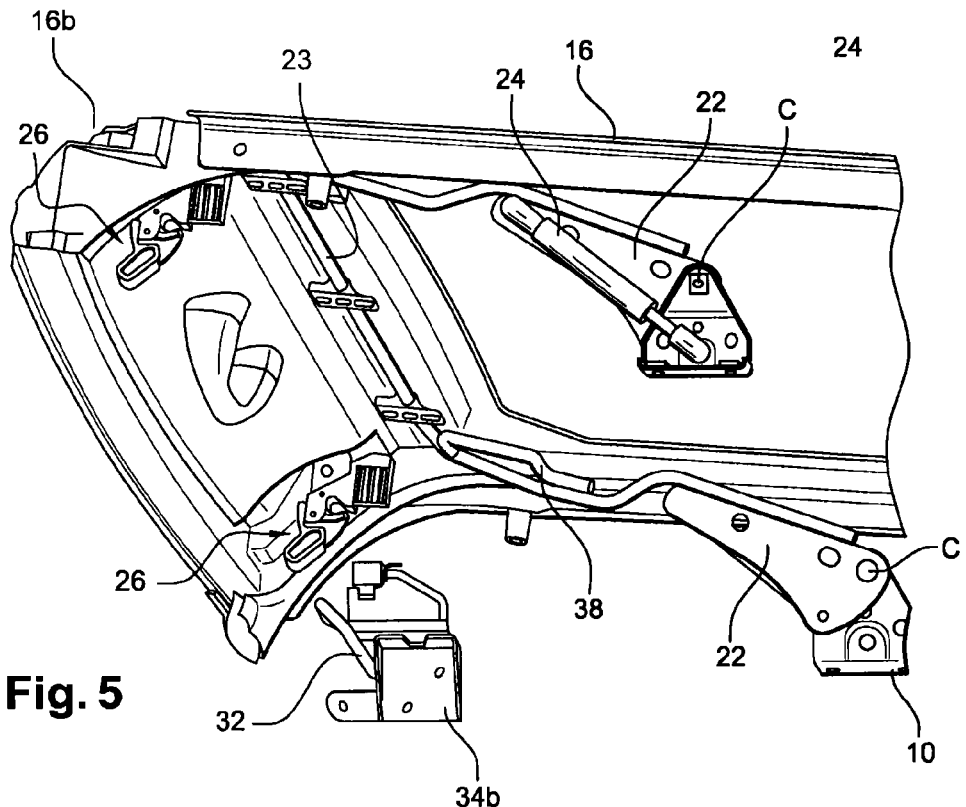
FIG. 5 is a bottom perspective view of the locking device of the invention in a position in front of the closed position.

With reference to FIGS. 1 to 5, the front transverse edge 16a of the opening panel 16 is mounted such that it can rotate about a pin A on two carriages 19. The carriages slide mainly in translation, in each case in a rail 20 which is integral with the upper face of the roof 12. Each rail 20 extends in the longitudinal direction of the vehicle from the front transverse edge of the opening 18 located at the front of the vehicle, over a distance approximately identical to the size of the opening panel 16 in the longitudinal direction, as shown in FIG. 4.

The carriages 19 and the rails 20 thus form means for guiding the opening panel in a mainly longitudinal travel, said means being able to guide said opening panel between its closed and open positions.

The opening panel 16 is hinged to the end of a link rod 22, about a pin B which is transverse to the vehicle and located close to the rear transverse edge 16b thereof. The other end of the link rod 22 is hinged to the structure of the vehicle about a pin C which is likewise transverse to the vehicle.

Each link rod 22 has a pin-to-pin distance which is approximately the same as half the size of the opening panel 16 in the longitudinal direction of the vehicle, and is hinged to the opening panel and to the structure of the vehicle such that, in the closed position, the hinge pins B and C of the link rod 22 are located approximately in a single horizontal plane. The greatest degree of access to the opening 18 is thus possible in the open position (FIGS. 2 and 4). The link rods 22 thus make it possible to move the opening panel between its open and closed positions with a longitudinal travel.

The link rods 22 can be connected together by a central element 23 (FIG. 5) forming for example the rotary pin B of the opening panel with respect to the link rods 22. The assembly formed by the link rods 22 and the central element 23 can also be produced in one piece.

One or two cylinders 24 for assisting opening of the opening panel can be connected to the link rods 22 and to the vehicle 10 in a similar manner to the cylinders conventionally used for opening vehicle tailgates.

A device for locking the opening panel allows blocking in the closed position in order to avoid any intrusion into the vehicle. This locking device also allows blocking in the open position in order to avoid accidental closure of the opening panel when the vehicle is traveling at high speed.

Figure 6:
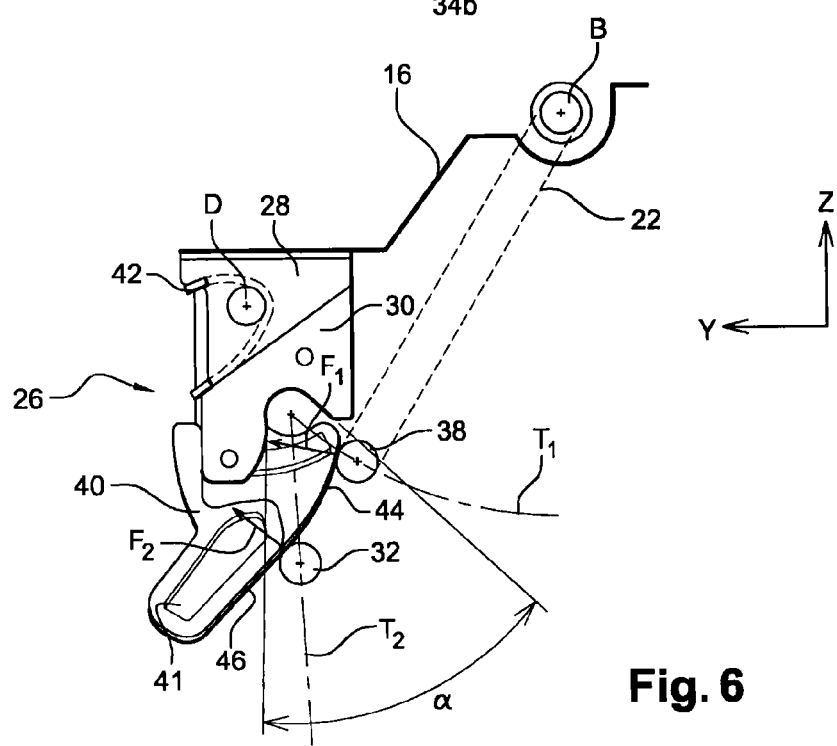
FIG. 6 is a view in longitudinal section of the lock of the locking device of the invention.

With reference to FIG. 6, the locking device comprises a lock 26 formed of a base 28 fixed to the inner face of the opening panel 16 between the rear transverse edge 16b of the opening panel 16 and the rotary pin B of the opening panel with respect to the link rod 22. The base 28 comprises a cutout 30 forming the locking throat that is able to receive a striker wire having an approximately transverse orientation. The distance between the axis of the throat 30 and rotary pin B of the opening panel with respect to the link rod 22 is approximately the same as the distance between the rotary pin B and the second striker wire 38 fixed to the link rod 22.

A latch 40 is mounted such that it can pivot on the base 28 about a pin D so as to be able to close off the entrance to the throat 30. The latch 40 includes a grasping area 41 in order that it can be pivoted manually in order to uncover the throat 30. An elastic return means 42, for example a return spring, is located between the base 28 and the latch 40 so as to force the latch 40 back into the position closing off the entrance to the throat 30.

In the closed position, the lock 26 is able to be coupled in a reversible manner to a first striker wire 32 that is secured to a structural element (34a or 34b) of the upper rear part of the body (FIG. 3), for example a roof rear cross member 34a, which conventionally serves as an upper anchoring point for the rear swinging door 14 of the motor vehicle 10, or onto a rear part 34b of the side rails 36 of the roof 12 of the vehicle 10 when said vehicle is not provided with a roof rear cross member.

In the open position, the locking device 26 is able to be coupled reversibly to a second striker wire 38 secured to a link rod 22. In this example, the second striker wire 38 is welded transversely to the link rod 22 between the hinge pins B and C of said link rod. Thus, the movement of the second striker wire 38 is linked to the opening movement of the opening panel and describes a circular path about the pin B with respect to the opening panel 16.

Further configurations of the second striker wire may be possible; for example, it can be linked to an assisting cylinder 24 or any other mechanism able to move with respect to the opening of the girafon 16.

The opening panel 16 is opened in the following manner. The latch 40 is pivoted by the user performing a lever action on the grasping area 41 of said latch 40 so as to unblock the first striker wire 32 of the throat 30. The opening panel is then released in the rear part of the vehicle 10. The user, aided by the assisting cylinders 24, causes the girafon 16 to move in accordance with the kinematics defined by the mechanism of the link rods 22 and carriages 19. Thus, the rear transverse edge 16b of the opening panel pivots about the pin C, describing a circular arc toward the front of the vehicle and driving the front transverse edge 16a of the opening panel toward the front of the vehicle by the sliding of the carriages in the rails 20.

When it reaches the completely open position, the second striker wire 38 of the link rod 22 of the opening panel 16 comes into contact with a first edge 44 of the latch 40 of the lock by a circular path about the pivot pin B of the opening panel 16 with respect to the link rod 22. The first edge 44 of the latch 40 is convex so as to form an appropriate angle with the path T1 of the second striker wire in order that the force (represented by the arrow F1) of the second striker wire on the first edge 44 pivots the latch about the pin D, the second striker wire sliding along the first edge 44. Thus, the latch automatically uncovers the throat 30 in the lock without the user having to perform a lever action on the grasping area of the latch 40. Once the second striker wire has been positioned in the throat 30, the latch 40 returns to the blocking position under the force of the return spring 42.

The opening panel 16 is closed in the opposite way to its opening, in the following manner. The latch 40 is pivoted by the user performing a lever action on the grasping area of said latch 40 so as to unblock the second striker wire 38 in the throat 30. The opening panel is thus released. The user, aided by the assisting cylinders 24, causes the girafon to move in accordance with the kinematics defined by the mechanism of the link rods and carriages. Thus, the rear transverse edge 16b of the opening panel pivots about the pin C, describing a circular arc toward the rear of the vehicle and driving the front transverse edge 16a of the opening panel toward the rear of the vehicle by the sliding of the carriages in the rails 20.

When it reaches the completely closed position, a second edge 46 of the latch 40 prolonging the first edge 44 of the latch 40 of the lock comes into contact with the first striker wire 32, which is fixed with respect to the vehicle, in an approximately circular path about the pivot pin C of the link rod 22 with respect to the vehicle 10. Specifically, with the carriages being virtually at the end of their travel in the rails 20, the front transverse edge 16a is virtually fixed and thus has little influence on the path of the rear transverse edge 16b during locking. The second edge 46 of the latch 40 is likewise convex so as to form an appropriate angle with the path T2 of the first striker wire with respect to the latch in order that the force (represented by the arrow F2) of the first striker wire on the second edge 46 pivots the latch about the pin D. The first striker wire then slides along the second edge 46 and then along the first edge 44, which is likewise appropriate, in order that the force F2 pivots the latch about the pin D. Thus, the latch automatically uncovers the throat 30 in the lock without the user having to perform a lever action on the grasping area of the latch 40. Once the first striker wire 32 has been positioned in the throat 30, the latch 40 returns to the blocking position under the force of the return spring 42.

According to one feature of the invention, the walls of the cutout forming the throat 30 form an angle α. Specifically, the position of the first and second striker wires 32 or 38 in the throat is identical when the opening panel is locked in the closed or open position; however, in order to satisfy the different paths that each of the striker wires takes to reach the throat 30, a first wall of said throat should be approximately tangent to the path T2 of the second striker wire 38 in order to lock the opening panel in the open position, that is to say a circular path about the pin B, and a second wall of the throat 30 should be approximately tangent to the path T1 of the first striker wire 32 in order to lock the opening panel in the closed position, that is to say an approximately circular path about the pin C.

Of course, the opening panel can be mounted in a different configuration, in particular so as to open not toward the front of the vehicle but toward the rear of the vehicle. The opening is then further from the rear transverse wall of the vehicle.

Provision can also be made of a single link rod on one side of the opening panel when the structure of the latter allows this.

This invention makes it possible advantageously to have only one striker wire which is fixed with respect to the vehicle. This then allows a reduction in the number of parts of the mechanism, and a simpler design, whatever the structure of the vehicle, for example when the structure makes it impossible to fit a second striker wire which is fixed with respect to the vehicle.

In addition, the invention also provides greater comfort and ease of use while limiting manual actions in order to open or close the lock.

The invention claimed is:

1. A locking mechanism for a motor vehicle opening panel, the locking mechanism comprising:
    a pin mounted on a base;
    a throat located on the base;
    a latch pivotally mounted about the pin on the base and adapted to pivot on the pin between a position blocking the throat and a position unblocking the throat, the latch having a first convex edge and a second convex edge that prolongs the first convex edge;
    a second striker constrained to move with respect to the base along a first path that intersects the throat, the second striker being adapted to be fixed to a mechanism that is movably linked to a structural element of the motor vehicle; and
    a first striker constrained to move with respect to the base along a second path that intersects the throat, the first striker being adapted to be fixed to a structural element of the motor vehicle,
    wherein the second striker applies a first force to the first convex edge of the latch to pivot the latch about the pin from the position blocking the throat to the position unblocking the throat, enabling the throat to receive the second striker, and
    wherein the first striker applies a second force to the second convex edge of the latch to pivot the latch about the pin from the position blocking the throat to the position unblocking the throat, enabling the throat to receive the first striker.

2. A device for an opening panel for a motor vehicle, the opening panel including an opening mechanism that moves between a closed position, in which the opening panel closes off an opening in a roof of the vehicle, and an open position, in which the opening panel at least partially uncovers the opening, the opening mechanism of the opening panel including at least one link rod, a first end of which is adapted to be hinged to the vehicle about a first fixed transverse pin and a second end of which is hinged to the opening panel such that it moves about a second transverse pin, the opening panel adapted to be mounted such that it pivots about a third transverse pin that moves longitudinally with respect to the roof, the device comprising:
    a locking mechanism as claimed in claim 1, the base of the locking mechanism being fixed to the opening panel, and the latch engages with the first striker when the latch moves into the closed position of the opening panel and with the second striker when the latch moves into the open position of the opening panel.

3. The device for an opening panel as claimed in claim 2, wherein the first convex edge of the latch of the locking mechanism forms an appropriate angle with the first path of the second striker with respect to the latch, so that the force of the second striker on the first edge pivots the latch and uncovers the throat of the locking mechanism.

4. The device for an opening panel as claimed in claim 2, wherein the second convex edge of the latch of the locking mechanism forms an appropriate angle with the second path of the first striker with respect to the latch, so that the force of the first striker on the second edge pivots the latch and uncovers the throat of the lock locking mechanism.

5. The device for an opening panel as claimed in claim 3, wherein the second convex edge of the latch of the locking mechanism forms an appropriate angle with the second path of the first striker with respect to the latch, so that the force of the first striker on the second edge pivots the latch and uncovers the throat of lock locking mechanism.

6. The device for locking an opening panel as claimed in claim 3, wherein a first wall of the throat is approximately tangent to the second path, and a second wall of the throat is approximately tangent to the first path.

7. The device for locking an opening panel as claimed in claim 4, wherein a first wall of the throat is approximately tangent to the second path, and a second wall of the throat is approximately tangent to the first path.

8. The device for locking an opening panel as claimed in claim 5, wherein a first wall of the throat is approximately tangent to the second path, and a second wall of the throat is approximately tangent to the first path.

9. The device for an opening panel as claimed in claim 2, wherein the second striker moves with respect to the base and with respect to the vehicle.

10. The device for an opening panel as claimed in claim 9, wherein the second striker is fixed to the at least one link rod.

11. The device for an opening panel as claimed in claim 9, wherein the second striker is fixed to an assisting cylinder.

* * * * *